US011319389B2

(12) United States Patent
Balan et al.

(10) Patent No.: US 11,319,389 B2
(45) Date of Patent: May 3, 2022

(54) VINYLIDENE SUBSTITUTED AROMATIC MONOMER AND CYCLIC (METH)ACRYLATE ESTER POLYMERS (71) Applicant: TRINSEO EUROPE GMBH, Horgen (CH)

(72) Inventors: Abidin Balan, Breda (NL); Gilbert Bouquet, Ghent (BE); Pascal E.R.E.J. Lakeman, Breda (NL)

(73) Assignee: TRINSEO EUROPE GMBH, Horgen (CH)

( * ) Notice: Subject to any disclaimer, the term of this patent is extended or adjusted under 35 U.S.C. 154(b) by 0 days.

(21) Appl. No.: 17/282,392

(22) PCT Filed: Oct. 4, 2019

(86) PCT No.: PCT/EP2019/076904
§ 371 (c)(1),
(2) Date: Apr. 2, 2021

(87) PCT Pub. No.: WO2020/070284
PCT Pub. Date: Apr. 9, 2020

(65) Prior Publication Data
US 2021/0332172 A1   Oct. 28, 2021

(30) Foreign Application Priority Data
Oct. 5, 2018  (EP) .................................... 18198819

(51) Int. Cl.
C08F 212/10 (2006.01)
C08L 9/00 (2006.01)
C08L 25/14 (2006.01)
C08F 212/08 (2006.01)
C08F 220/18 (2006.01)

(52) U.S. Cl.
CPC .......... *C08F 220/18* (2013.01); *C08F 212/08* (2013.01); *C08F 212/10* (2013.01); *C08L 9/00* (2013.01); *C08L 25/14* (2013.01)

(58) Field of Classification Search
CPC .................................................. C08F 212/10
See application file for complete search history.

(56) References Cited

U.S. PATENT DOCUMENTS

| | | | |
|---|---|---|---|
| 2,727,884 A | 12/1955 | McDonald | |
| 3,243,481 A | 3/1966 | Ruffing | |
| 3,660,535 A | 5/1972 | Finch | |
| 3,681,475 A | 8/1972 | Spilner | |
| 4,239,863 A | 12/1980 | Bredeweg | |
| 5,412,036 A | 5/1995 | Traugott et al. | |
| 5,446,103 A | 8/1995 | Traugott et al. | |
| 10,100,216 B2 | 10/2018 | Chao et al. | |
| 11,066,615 B2* | 7/2021 | Thomaides | C10L 1/1963 |
| 2011/0282000 A1 | 11/2011 | Hayes | |
| 2014/0080967 A1* | 3/2014 | Hayes | C09J 147/00 524/553 |
| 2016/0168413 A1* | 6/2016 | Chao | B60R 13/08 524/533 |

FOREIGN PATENT DOCUMENTS

| | | | | |
|---|---|---|---|---|
| DE | 4010511 A1 | 10/1990 | | |
| EA | 412801 A1 | 2/1991 | | |
| JP | S61152708 A | 7/1986 | | |
| JP | 10330431 A | * 12/1998 | ............ | C08F 212/04 |
| JP | 200622317 A | 1/2006 | | |
| WO | 2016188837 A1 | 12/2016 | | |
| WO | 2016188839 A1 | 12/2016 | | |
| WO | WO-2017134251 A1 | * 8/2017 | .............. | C10L 10/12 |

OTHER PUBLICATIONS

Machine translation of JP 10330431 A, retrieved Oct. 2021 (Year: 2021).*
Peacock (2006). Polymer Chemistry—Properties and Applications—21.2.2. Random Copolymers of Polystyrene. Hanser Publishers. Retrieved from https://app.knovel.com/hotlink/pdf/id:kt008VKHE5/polymer-chemistry-properties/random-copolymers-styrene (Year: 2006).*
Table: Glass Transition Temperatures of Polymers, poly(glycidyl methacrylate), Polymer Handbook (4th Edition) (Year: 1999).*
Table: Glass Transition Temperatures of Polymers, poly(2-ethylhexyl acrylate), Polymer Handbook (4th Edition) (Year: 1999).*
Zhang et al. "Preparation of Poly(styrene-co-isobornyl methacrylate) Beads Having Controlled Glass Transition Temperature by Suspension Polymerization" Journal Applied Polymer Science 2013, pp. 113-120 DOI: 10.1002/APP.38710, published online on Nov. 3, 2012.
Extended European Search Report (includes Supplementary European Search Report and European Search Opinion) received for European Patent Application No. 18108819 dated Mar. 15, 2019, 7 pages.

(Continued)

*Primary Examiner* — Nicole M. Buie-Hatcher
(74) *Attorney, Agent, or Firm* — Young Basile Hanlon & MacFarlane, P.C.

(57) ABSTRACT

Compositions comprising at least one copolymers comprising: a) from 20 to 90 percent by weight of one or more vinylidene substituted aromatic compounds; b) from 10 to 80 percent by weight of one or more cyclic (meth)acrylate esters; c) from 0 to 40 percent by weight of one or more unsaturated nitriles; and, d) from 0 to 60 percent by weight of an alkyl (meth)acrylate; wherein based on the weight of the copolymer and the copolymer has a weight average molecular weight of 120,000 g/Mole or greater and a glass transition temperature of 100° C. or greater. Disclosed are articles prepared from the compositions which may be fabricated in any known manner. The copolymers, compositions and articles disclosed contain reduced levels of the one or more free/residual/unreacted monomers, such as unsaturated nitriles; may be transparent or opaque; or have a biobased monomer content of 5 percent by weight or greater.

20 Claims, 3 Drawing Sheets

(56) References Cited

OTHER PUBLICATIONS

International Search Report and Written Opinion received for PCT Patent Application No. PCT/EP2019/076904, dated Jan. 7, 2020, 13 pages.
Office Action in co-pending patent application JP2021-518559 dated Oct. 5, 2021, with English translation (13 pages).
Office Action in co-pending patent application KR10-2021-7009983 dated Nov. 23, 2021, with English translation (19 pages).

\* cited by examiner

VINYLIDENE SUBSTITUTED AROMATIC MONOMER AND CYCLIC (METH)ACRYLATE ESTER POLYMERS

CROSS-REFERENCE TO RELATED APPLICATIONS

This application is a 371 application of International Application No. PCT/EP2019/076904, filed on Oct. 4, 2019, which claims priority from European Application No. 18198819.7, filed on Oct. 5, 2018, the entire disclosure of which is hereby incorporated by reference.

TECHNICAL FIELD

This disclosure relates to polymers containing vinylidene substituted aromatic monomers and cyclic (meth)acrylate esters and processes for preparing such polymers.

BACKGROUND

Polymers prepared from vinylidene substituted aromatic monomers, such as styrene, are used in a number of polymeric systems, including foams, packaging (food packaging), medical, electronic, optical, appliance and automotive applications. In certain applications the glass transition temperature of homopolymers of vinylidene substituted aromatic monomers is lower than required for the applications. Co-polymers of vinylidene substituted aromatic monomers and acrylonitrile were developed to increase the glass transition temperature and the use temperature of vinylidene substituted aromatic monomer based polymers, commonly referred to as styrene-acrylonitrile (SAN). Polymers of vinylidene substituted aromatic monomers do not exhibit great impact properties and modified polymers containing vinylidene substituted aromatic monomers have been developed to improve the impact resistance. Such modified polymers may contain butadiene based rubber, for example copolymers of styrene and acrylonitrile modified with polybutadiene rubber, commonly referred to as acrylonitrile-butadiene-styrene (ABS). Another class of polymers comprise polystyrene modified with impact modifiers often referred to as high impact polystyrene (HIPS). In many applications for polymers containing vinylidene substituted aromatic monomers transparency or opaqueness is required.

There is a desire in the polymer business to increase the content of monomers derived from biobased raw materials. The concern is that users are not willing to compromise with respect to the properties of the polymers with replacement of non-biobased monomers with biobased monomers. Examples of attempts to replace non-biobased monomers in vinylidene substituted aromatic monomer containing polymers are disclosed in WO 2016-188839, and Zhang et al. "Preparation of Poly(styrene-co-isobornyl methacrylate) Beads Having Controlled Glass Transition Temperature by Suspension Polymerization" Journal Applied Polymer Science 2013, pp 113-120 DOI: 10.1002/APP.38710, published online on 3 Nov. 2012. If there are certain unreacted monomers in polymers prepared from vinylidene substituted aromatic monomers, the unreacted monomers can plasticize the polymers and degrade the properties of the polymers and articles prepared therefrom, for instance the glass transition temperatures, impact properties, and stiffness properties etc.

Thus there is a need for polymers containing vinylidene substituted aromatic monomers which contain increased content of biobased monomers while maintaining the excellent properties of the polymers, including transparency, high glass transition temperatures, impact properties, stiffness properties and the like. There is a need to reduce the amount of or replace acrylonitrile in vinylidene substituted aromatic monomer based polymers exhibiting high glass transition temperatures. There is a need to reduce the level of unreacted monomers in such polymers or articles prepared from such polymers.

SUMMARY

Disclosed herein are compositions comprising at least one copolymers comprising: a) from about 20 to about 90 percent by weight of one or more vinylidene substituted aromatic compounds; b) from about 10 to about 80 percent by weight of one or more cyclic (meth)acrylate esters; c) from about 0 to about 40 percent by weight of one or more unsaturated nitriles; and, d) from about 0 to 60 percent by weight of an alkyl (meth)acrylate; wherein the weight of the monomers is based on the weight of the copolymer and the copolymer has a weight average molecular weight of about 120,000 g/mole or greater and a glass transition temperature of about 100° C. or greater. The copolymers contain the residues of the recited compounds. The cyclic (meth)acrylate esters may comprise one or more cyclic or polycyclic groups. The residual cyclic (meth)acrylate ester content of the copolymer may be about 1 percent by weight or less based on the weight of the copolymer. The copolymer may exhibit a transparency of about 85 percent or greater. The copolymer may contain about 10 percent by weight or greater of bio-based content. The cyclic or polycyclic groups of the cyclic (meth)acrylate esters may be aliphatic. The cyclic (meth)acrylate esters may comprise one or more of cyclohexyl (meth)acrylate, adamantyl (meth)acrylate, norbornyl methacrylate and isobornyl (meth)acrylate.

Disclosed is a composition, comprising at least one copolymer comprising: a) from about 20 to about 90 percent by weight of one or more vinylidene substituted aromatic compounds; b) from about 10 to about 80 percent by weight of one or more polycyclic (meth)acrylate esters; c) from about 0 to about 40 percent by weight of one or more unsaturated nitriles; and, d) from about 0 to 60 percent by weight of one or more alkyl (meth)acrylates; wherein the weight percentage is based on the weight of the copolymer and the copolymer has a weight average molecular weight of about 120,000 g/Mole or greater and a glass transition temperature of about 100° C. or greater wherein the molecular weight is determined by gel permeation chromatography using polystyrene standards and the glass transition temperature is determined using differential scanning calorimetry; with the proviso that one or more of the following features is present: the copolymer contains about 1 percent by weight or greater of one or more unsaturated nitriles; the copolymer contains about 1 percent by weight or greater of one or more straight chain alkyl acrylates; the composition contains one or more impact modifiers; or, the composition contains one or more mold release agents or fibers. The copolymer may contain a sufficient amount of one or more vinylidene substituted aromatic compounds and one or more polycyclic (meth)acrylate esters to provide the desired glass transition temperatures, The copolymer may contain from about 50 percent to about 100 percent by weight of one or more vinylidene substituted aromatic compounds and one or more polycyclic (meth)acrylate esters. The copolymer may contain from about 70 percent to about 100 percent by weight of one or more vinylidene substituted aromatic compounds and one or more polycyclic (meth)acrylate esters.

The copolymer may comprise a) from about 20 to about 80 percent by weight of one or more vinylidene substituted aromatic compounds; and b) from about 20 to about 80 percent by weight of one or more cyclic (meth)acrylate esters. The ratio of the one or more vinylidene substituted aromatic compounds to one or more cyclic (meth)acrylate esters may be about 4:1 to about 1:4. The copolymers may comprise a) from about 20 to about 90 percent by weight of one or more vinylidene substituted aromatic compounds; b) from about 10 to about 80 percent by weight of one or more cyclic (meth)acrylate esters; c) 0 percent by weight of one or more unsaturated nitriles; and, d) 0 percent by weight of an alkyl (meth)acrylate; wherein the weight of the comonomers is based on the weight of the copolymer and the homopolymer of the alkyl (meth)acrylate exhibits a glass transition temperature of about 100° C. or greater. The one or more vinylidene substituted aromatic compounds may comprise monovinylidene aromatic compounds. The at least one copolymer may be linear or branched or a combination thereof.

The composition may further comprise one or more impact modifiers, which may be materials commonly referred to as rubbers. The composition may comprise from about 50 to about 99.5 percent by weight of the copolymer and from about 0.5 to about 50 percent by weight of the impact modifier based on the weight of the composition. The composition may comprise a continuous matrix of the copolymer of one or more vinylidene substituted aromatic compounds, one or more cyclic (meth)acrylate esters, optionally of one or more unsaturated nitriles, and optionally one or more alkyl (meth)acrylates, and a dispersed phase comprising rubber. The dispersed phase may comprise particles of about 0.05 to about 10.0 microns. The impact modifier may also be grafted to the copolymers described herein. The copolymers may be grafted to the impact modifier. The impact modifier that is grafted to the copolymer or that the copolymer is grafted to may be polybutadiene.

Disclosed is a method comprising: a) contacting one or more vinylidene substituted aromatic compounds, one or more cyclic (meth)acrylate esters, optionally one or more unsaturated nitriles, and optionally one or more alkyl (meth)acrylates; optionally in the presence of a radical polymerization initiator under conditions such that at least one copolymer of the one or more monovinylidene aromatic compounds, the one or more cyclic (meth)acrylate esters, optionally the one or more unsaturated nitriles, and optionally the one or more alkyl (meth)acrylates is formed; b) removing unreacted starting materials; and c) removing the formed copolymer. The method may comprise contacting from about 20 to about 90 percent by weight of one or more vinylidene substituted aromatic compounds; about 10 to about 80 percent by weight of one or more cyclic (meth) acrylate esters; about 0 to about 40 percent by weight of one or more unsaturated nitriles; and about 0 to 60 percent by weight of one or more alkyl (meth)acrylates. The mixture of the one or more vinylidene substituted aromatic compounds, the one or more cyclic (meth)acrylate esters, optionally of one or more unsaturated nitriles, and optionally one or more alkyl (meth)acrylates may be contacted at a temperature of about 60 to about 200° C. The radical polymerization initiator may be present in an amount of about 0 to about 0.1 percent by weight of the mixture of the starting monomers, the one or more monovinylidene aromatic compounds, the one or more cyclic (meth)acrylate esters, optionally one or more unsaturated nitriles, and optionally one or more alkyl (meth)acrylates. The method may comprise dispersing one or more impact modifiers into the monomer mixture before introduction of the mixture into a reactor; introducing the formed mixture into a reactor to produce a continuous matrix of the copolymer of the monomers and a dispersed phase comprising the impact modifier. The method may comprise dissolving or dispersing the monomer mixture and optionally the impact modifier in an inert solvent. The recovered copolymers may be blended with one or more impact modifiers.

Disclosed are articles prepared from the compositions disclosed herein. Such articles may be fabricated in any known manner commonly used with polymers containing one or more vinylidene substituted aromatic compounds. The articles may be fabricated by molding, extrusion, thermoforming, foaming, blow molding, injection molding, extrusion blow molding and combinations thereof. The articles may be molded, extruded, extruded and molded, and the like. The articles disclosed may exhibit glass transition temperatures of about 100° C. or greater. The articles disclosed may be transparent or opaque.

The copolymers, compositions and articles disclosed may contain reduced levels of the one or more free/residual/unreacted monomers, such as unsaturated nitriles. The copolymers, compositions and articles disclosed may contain reduced levels of the unsaturated nitriles of about 10 ppm or less or about 5 ppm or less. The copolymers, compositions and articles disclosed may be transparent or opaque. The copolymers, compositions and articles disclosed may exhibit a transparency of 85 percent or greater. The copolymers disclosed exhibit glass transition temperatures of about 100° C. or greater, 110° C. or greater, 120° C. or greater or 140° C. or greater. The copolymers and articles prepared from the copolymers may exhibit a free/residual/unreacted monomer content of about 1 percent by weight or less or about 0.8 percent by weight or less. The copolymers may exhibit a polydispersity of 3 or less. The copolymers may exhibit a polydispersity of 2 or greater. The copolymers and articles prepared from the copolymers may exhibit a free (meth)acrylate monomer content of about 1 percent by weight or less or about 0.8 percent by weight or less. The biobased monomer content of the copolymers or compositions may be 10 percent by weight or greater, 15 percent by weight or greater or 20 percent by weight or greater. The copolymers may contain modern carbon or $^{14}C$.

DETAILED DESCRIPTION

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

Disclosed is a composition comprising a copolymer comprising the residue of one or more vinylidene substituted aromatic compounds, one or more cyclic (meth)acrylate esters, optionally one or more unsaturated nitriles, and optionally one or more alkyl (meth)acrylates. Disclosed is a method of preparing such compositions. The disclosed compositions and methods provide for compositions and articles that exhibit biobased monomer content, lower levels of unreacted monomers, transparency and glass transition temperatures as disclosed herein. Residues of the recited compounds refer the portion of the recited compounds remaining in a copolymer after polymerization.

Disclosed are exemplary embodiments hereinafter.

Embodiment 1, a composition, comprising at least one copolymer comprising: a) from about 20 to about 90 percent by weight of one or more vinylidene substituted aromatic compounds; b) from about 10 to about 80 percent by weight of one or more cyclic (meth)acrylate esters; c) from about 0 to about 40 percent by weight of one or more unsaturated nitriles; and, d) from about 0 to 60 percent by weight of one or more alkyl (meth)acrylates; wherein the weight of the comonomers is based on the weight of the copolymer and the copolymer has a weight average molecular weight of about 120,000 Daltons or greater and a glass transition temperature of about 100° C. or greater. Embodiment 2, a composition, comprising at least one copolymer comprising: a) from about 20 to about 90 percent by weight of one or more vinylidene substituted aromatic compounds; b) from about 10 to about 80 percent by weight of one or more polycyclic (meth)acrylate esters; c) from about 0 to about 40 percent by weight of one or more unsaturated nitriles; and, d) from about 0 to 60 percent by weight of one or more alkyl (meth)acrylates; wherein the weight percentage is based on the weight of the copolymer and the copolymer has a weight average molecular weight of about 120,000 g/Mole or greater and a glass transition temperature of about 100° C. or greater wherein the molecular weight is determined by gel permeation chromatography using polystyrene standards and the glass transition temperature is determined using differential scanning calorimetry; with the proviso that one or more of the following features is present: the copolymer contains about 1 percent by weight or greater of one or more unsaturated nitriles; the copolymer contains about 1 percent by weight or greater of one or more straight chain alkyl acrylates; the composition contains one or more impact modifiers; or, the composition contains one or more mold release agents or fibers. Embodiment 3, the composition of embodiment 1 or 3 wherein the copolymer contains from about 50 percent to about 100 percent by weight of one or more vinylidene substituted aromatic compounds and one or more polycyclic (meth)acrylate esters. Embodiment 4, the composition of Embodiment 1 to 3 wherein the copolymer contains from about 70 percent to about 100 percent by weight of one or more vinylidene substituted aromatic compounds and one or more polycyclic (meth)acrylate esters. Embodiment 5, the composition according to any one of the preceding embodiments wherein the copolymer contains from about 0.1 to about 10 weight percent of one or more straight chain C8 to $C_{16}$ alkyl acrylates based on the weight of the copolymers. Embodiment 6, the composition of any one of the preceding embodiments wherein the one or more unsaturated nitriles are present in an amount of about 5 percent to about 30 percent by weight. Embodiment 7, the composition of any one of the preceding embodiments wherein the one or more unsaturated nitriles are present in an amount of about 10 percent to about 25 percent by weight. Embodiment 8, the composition of any one of the preceding embodiments in which the copolymer can be linear or branched, or a combination thereof. Embodiment 9, the composition of any one of the preceding embodiments, wherein the cyclic (meth)acrylate esters comprise one or more cyclic or polycyclic groups. Embodiment 10, the composition according to any of the preceding embodiments wherein the residual cyclic (meth)acrylate ester content of the copolymer is about 1 percent by weight or less based on the weight of the copolymer. Embodiment 11 the composition according to any of the preceding embodiments wherein the copolymer exhibits a transparency of about 85 percent or greater. Embodiment 12, the composition according to any of the preceding embodiments wherein the copolymer contains about 5 percent by weight or greater of bio-based content. Embodiment 13, the composition according to any of the preceding embodiments wherein the cyclic or polycyclic groups of the cyclic (meth)acrylate esters are aliphatic. Embodiment 14, the composition according to any of the preceding embodiments wherein the cyclic (meth)acrylate esters comprise one or more of cyclohexyl (meth)acrylate, adamantyl (meth)acrylate, norbornyl methacrylate and isobornyl (meth)acrylate. Embodiment 15, the composition according to any of the preceding embodiments wherein the cyclic (meth)acrylate esters comprise isobornyl (meth)acrylate. Embodiment 16, the composition according to any of the preceding embodiments wherein the polydispersity of the copolymer is about 3.0 or less. Embodiment 17, the composition according to any of the preceding embodiments wherein the copolymer comprises a) from about 20 to about 80 percent by weight of one or more vinylidene substituted aromatic compounds: and b) from about 20 to about 80 percent by weight of one or more cyclic (meth)acrylate esters. Embodiment 18, the composition according to any of the preceding embodiments which further comprises an impact modifier. Embodiment 19, the composition according to embodiment 18 comprising from about 20 to about 85 percent by weight of the copolymer and from about 0.5 to about 50 percent by weight of the impact modifier based on the weight of the composition. Embodiment 20, the composition according to embodiment 18 or 19 wherein the ratio of the one or more vinylidene substituted aromatic compounds to the one or more cyclic (meth)acrylate esters is about 4:1 to about 1:4 and the composition exhibits a transparency of about 85 percent or greater. Embodiment 21, the composition according to any one of embodiments 18 to 20 which comprises a continuous matrix of the copolymer of one or more vinylidene substituted aromatic compounds, one or more cyclic (meth)acrylate esters, optionally one or more unsaturated nitriles and optionally one or more alkyl (meth)acrylates, and a dispersed phase comprising an impact modifier. Embodiment 22 the composition according to any one of embodiments 18 to 21 wherein the dispersed phase comprises particles of about 0.05 to about 6.0 micrometers. Embodiment 23, the composition according to any of the preceding embodiments which exhibits a transparency of about 85 percent or greater. Embodiment 24, the composition according to any of the preceding claims wherein the copolymer exhibits a glass transition temperature of about 110° C. or greater. Embodiment 25, the composition according to any of the preceding embodiments wherein the copolymer exhibits a glass transition temperature of about 120° C. or greater. Embodiment 26, the composition according to any one of the preceding embodiments comprising one or more copolymers comprising: from about 20 to about 90 percent by weight of one or more vinylidene substituted aromatic compounds; from about 10 to about 80 percent by weight of one or more cyclic (meth)acrylate esters; c) 0 percent by weight of one or more unsaturated nitriles; and, d) 0 percent by weight the copolymer of one or more alkyl (meth)acrylate, wherein the weight of the monomers is based on the weight of the copolymer. Embodiment 27, a composition according to any one of embodiments 1 to 26 wherein the copolymer contains modern carbon or $^{14}C$. Embodiment 28, a method comprising: a) contacting one or more vinylidene aromatic substituted compounds, one or more cyclic (meth)acrylate esters, optionally one or more unsaturated nitriles, and optionally one or more alkyl (meth)acrylates; in the presence of a radical polymerization initiator under conditions such that a copolymer of the one or more vinylidene substituted aromatic compounds, the one or more cyclic (meth)acrylate esters, optionally one or more unsaturated nitriles, and optionally one or more alkyl (meth)acrylates and optionally one or more alkyl (meth)acrylates is formed and optionally an inert solvent or diluent; b) removing unreacted starting materials and solvent or diluent; and c) removing the formed copolymer. Embodiment 29, the method of embodiment 28 wherein from about 20 to about 90 percent by weight of one or more vinylidene substituted aromatic compounds; about 10 to about 80 percent by weight of one or more cyclic (meth)acrylate esters; about 0 to about 40 percent by weight of one or more unsaturated nitriles; and about 0 to 60 percent by weight of one or more alkyl (meth)acrylates are contacted wherein the weight percent is based on the total weight of the monomers. Embodiment 30, The method of embodiment 28 or 29 wherein the radical polymerization initiator is present in an amount of about 0.001 to about 0.1 percent by weight of the mixture of the one or more vinylidene substituted aromatic compounds, the one or more cyclic (meth) acrylate esters, optionally one or more unsaturated nitriles, and optionally one or more alkyl (meth)acrylates and optionally one or more alkyl (meth)acrylates. Embodiment 31, the method of any one of embodiments 28 to 30 wherein from about 20 to about 90 percent by weight of one or more vinylidene substituted aromatic compounds; about 10 to about 80 percent by weight of one or more cyclic (meth) acrylate esters; about 0 to about 40 percent by weight of one or more unsaturated nitriles; and about 0 to 60 percent by weight of one or more alkyl (meth)acrylates are contacted. Embodiment 32, the method of any one of embodiments 28 to 31 wherein from about 20 to about 90 percent by weight of one or more vinylidene substituted aromatic compounds; about 10 to about 80 percent by weight of one or more cyclic (meth)acrylate esters; 0 percent by weight of one or more unsaturated nitriles; and 0 percent by weight of one or more alkyl (meth)acrylates are contacted. Embodiment 33, the method of any one of embodiments 28 to 32 wherein the one or more vinylidene substituted aromatic compounds and the one or more cyclic (meth)acrylate esters are contacted at a temperature of about 80° C. to about 200° C. for about 2 to about 10 hours. Embodiment 34, the method of any one of embodiments 28 to 3 wherein the one or more vinylidene substituted aromatic compounds, the one or more cyclic (meth)acrylate esters, optionally one or more unsaturated nitriles, and optionally one or more alkyl (meth)acrylates are reacted using a mass polymerization process. Embodiment 35, the method of any one of embodiments 28 to 34 wherein the one or more vinylidene substituted aromatic compounds, the one or more cyclic (meth)acrylate esters, optionally one or more unsaturated nitriles, and optionally one or more alkyl (meth)acrylates are reacted in a multi-zone plug flow reactor or in one or more continuously stirred reactors or a combination thereof. Embodiment 36, the method of any one of embodiments 28 to 35 wherein one or more impact modifiers are dispersed or dissolved into a mixture of the one or more vinylidene substituted aromatic compounds and one or more cyclic (meth)acrylate esters before introduction of the mixture into a reactor; introducing the formed mixture into a reactor to produce a continuous matrix of the copolymer of one or more vinylidene substituted aromatic compounds, one or more cyclic (meth)acrylate esters, optionally one or more unsaturated nitriles, and optionally one or more alkyl (meth)acrylates and the dispersed phase comprising the impact modifier. Embodiment 37, the method of any one of embodiments 28 to 36 wherein the mixture of the one or more vinylidene substituted aromatic compounds, one or more cyclic (meth)acrylate esters, optionally one or more unsaturated nitriles, and optionally one or more alkyl (meth) acrylates are dissolved or dispersed in an inert solvent or diluent. Embodiment 38, the method of any one of embodiments 28 to 37 wherein the dispersed phase exhibits a particle size of about 0.05 to about 6.0 microns. Embodiment 39, the method of any one of embodiments 28 to 37 wherein the recovered copolymers are blended with one or more impact modifiers. Embodiment 40, an article comprising the composition of any one of embodiments 1 to 27 in the form of a molded or extruded object having a glass transition temperature of about 100° C. or greater. Embodiment 41, an article comprising the composition of any one of embodiments 1 to 27 in the form of a molded or extruded object having a glass transition temperature of about 110° or greater. Embodiment 42, an article comprising the composition of any one of embodiments 1 to 27 which exhibits a transparency of 85 percent or greater.

The following procedures are used to determine the properties of polymer systems or articles made therefrom.

Gel permeation chromatography (GPC)-0.25 wt % polymer samples in THF (HPLC grade, uninhibited) are prepared at room temperature. 500 ppm 1,4-Di-t-butylbenzene are added as flow marker. Molecular weight distribution of copolymers are determined relative to polystyrene standards on a high performance liquid chromatograph fitted by 2 columns in series (PLgel 5-micron Mixed-C, 30-cm×7.5-mm) at 40° C. 50 μL is injected, polymers are eluted at 1.0 ml/min flow rate and molecular weight distributions are determined by diode array detector at 254 nm.

Differential scanning calorimetry (DSC) (ASTM D3418-15). 5-10 mg polymer sample is subjected to heating (20° C./min) up to 250° C. under nitrogen, cooled down (20° C./min) to room temperature and heated up (20° C./min) again. Glass transition temperatures (Tg) of copolymers are determined from the second heating curves.

Gas chromatography (GC). 750 mg of polymer is dissolved by shaking in 5 ml DCM which contains 0.5 mg n-butyl benzene as internal standard. When the sample is dissolved (after 1 h), 15 ml MeOH is added to precipitate the polymer. 2 ml of supernatant is filtered (0.45 μm) and 2 μL is injected into GC column. Injector temperature is 250° C. and flame ionization detector temperature is 300° C. Oven temperature is 65° C. for the first 4 mins and then it heats up to 300° C. (15° C./min) and stays constant for 16 min. Helium is the carrier gas.

Transparency (ASTM D1003). Transparency of polymers are tested on plaques (50 mm×75 mm×3 mm) which were injection molded using a mirror plate mold. Transmission was recorded at 23° C. between 400 nm and 700 nm using Datacolor 850 with following settings: Specular included, Aperture medium and UV filter 0% UV (Filter FL40).

Biobased monomer content means the percentage by weight of monomers in the copolymers disclosed herein which are derived from biologically based raw materials and not from petroleum based sources. Biobased monomers useful with the compositions described herein include monomers containing biobased carbon. As used herein the term biobased carbon is intended to mean carbon obtained from a biological source rather than a fossil oil based source. The biobased content of a monomer, a copolymer, or a copolymer composition can be determined using a method such as ASTM D6866-08. ASTM D6866-08 provides three different methods for determining the biobased content of a solid, liquid, or gaseous composition. For example, the compositions described herein can be dried as a film and tested as a solid. As defined by ASTM D6866-08, biobased content is the amount of biobased carbon in the material or product as a percent of the weight (mass) of the total organic carbon in the product. In particular, ASTM D6866-08 Method B measures the ratios of $^{14}C/^{12}C$ and $^{13}C/^{12}C$ in the composition using Accelerator Mass Spectrometry (AMS) and Isotope Ratio Mass Spectrometry (IRMS). Fossil based carbon contains essentially no $^{14}C$ because its age is much greater than the 5,730 year half-life of $^{14}C$. Thus, the presence and level of $^{14}C$ in a composition provides a direct measure of the amount of carbon that originated from a source other than a fossil fuel, i.e., the level of biobased carbon in the composition. Copolymer as used herein refers to polymers containing the residue of two or more monomers. Carbon based on biological sources can be referred to as modern carbon.

One or more as used herein means that at least one, or more than one, of the recited components may be used as disclosed. Residual content of a component refers to the amount of the component present in free form or reacted with another material, such as a polymer. Typically, the residual content of a component can be calculated from the ingredients utilized to prepare the component or composition. Alternatively, it can be determined utilizing known analytical techniques. Heteroatom as used herein means nitrogen, oxygen, and sulfur, more preferred heteroatoms include nitrogen and oxygen with oxygen most preferred. Hydrocarbyl as used herein refers to a group containing one or more carbon atom backbones and hydrogen atoms, which may optionally contain one or more heteroatoms. Where the hydrocarbyl group contains heteroatoms, the heteroatoms may form one or more functional groups well known to one skilled in the art. Hydrocarbyl groups may contain cycloaliphatic, aliphatic, aromatic or any combination of such segments. The aliphatic segments can be straight or branched. The aliphatic and cycloaliphatic segments may include one or more double and/or triple bonds. Included in hydrocarbyl groups are alkyl, alkenyl, alkynyl, aryl, cycloalkyl, cycloalkenyl, alkaryl and aralkyl groups. Cycloaliphatic groups may contain both cyclic portions and noncyclic portions. Hydrocarbylene means a hydrocarbyl group or any of the described subsets having more than one valence, such as alkylene, alkenylene, alkynylene, arylene, cycloalkylene, cycloalkenylene, alkarylene and aralkylene. Valence as used herein means a covalent bond between a hydrocarbyl or hydrocarbylene group and another group such as a carbonyl, oxygen, nitrogen or sulfur containing group or atom, or the referenced base compound. As used herein percent by weight or parts by weight refer to, or are based on, the weight of the compositions unless otherwise specified.

The polymerizable compositions and copolymers disclosed herein contain vinylidene substituted aromatic monomers. Vinylidene substituted aromatic monomers comprise vinylidene, alkenyl groups bonded directly to aromatic structures. The vinylidene substituted aromatic monomers may contain one or more aromatic rings, may contain one or two aromatic rings, or may contain one aromatic ring. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. Alkenyl groups comprise straight or branched carbon chains having one or more double bonds, or one double bond. The alkenyl groups useful for the vinylidene substituted aromatic monomers may include those that when bonded to an aromatic ring are capable of polymerization to form copolymers. The alkenyl groups may have 2 to 10 carbon atoms, 2 to 4 carbon atoms or 2 carbon atoms. Exemplary vinylidene substituted aromatic monomers include styrene, alpha methyl styrene, N-phenyl-maleimide and chlorinated styrenes; or alpha-methyl styrene and styrene. The vinylidene substituted aromatic monomers may be mono-vinylidene aromatic monomers, which contain one unsaturated group. Vinylidene aromatic monomers include but are not limited to those described in U.S. Pat. Nos. 4,666,987; 4,572,819 and 4,585,825, which are herein incorporated by reference. The monomer may correspond to the formula:

Wherein $R^1$ is separately in each occurrence hydrogen or methyl; and Ar is separately in each occurrence an aromatic group. Ar may contain one or more aromatic rings, may contain one or two aromatic rings, or may contain one aromatic ring. n is separately in each occurrence 1 to 3, 1 to 2 or 1. The aromatic rings can be unsubstituted or substituted with a substituent that does not interfere with polymerization of the vinylidene substituted aromatic monomers, or the fabrication of the polymers formed into desired structures. The substituents may be halogens or alkyl groups, such as bromine, chlorine or $C_1$ to $C_4$ alkyl groups; or a methyl group. The vinylidene substituted aromatic monomers may be present in the polymerizable composition or copolymers in a sufficient amount such that the polymer exhibits the advantageous properties associated with polymers of vinylidene substituted aromatic monomers, for instance polystyrene. Among the advantageous properties of polymers of vinylidene substituted monomers include glass transition temperatures of about 100° C. or greater, transparency where desired for the use, high heat deflection temperatures, and the like. The polymerizable compositions and copolymers disclosed herein contain vinylidene substituted aromatic monomers in an amount of about 10 percent by weight of the polymerizable compositions or copolymers or greater, about 15 percent by weight or greater or about 20 percent by weight or greater. The polymerizable compositions and copolymers disclosed herein contain vinylidene substituted aromatic monomers in an amount of about 90 percent by weight of the polymerizable compositions or copolymers or less, about 85 percent by weight or less or about 80 percent by weight or less. The recited amounts may relate to the amounts of vinylidene substituted aromatic monomers.

The compositions may contain branching agents commonly used in vinylidene aromatic based polymers. The branching agents may be vinylidene substituted aromatic monomers having 2 or more vinylidene groups. Other branching agents may include other difunctional and in general multifunctional (functionality >2) monomers, multifunctional initiators and multifunctional chain transfer agents and the like. The branching agents may be present in the polymerizable compositions in an amount of about 0.001 percent by weight of the composition or greater, about 0.002 percent by weight or greater or about 0.003 percent by weight or greater. The branching agents may be present in the polymerizable compositions in an amount of about 0.5 percent by weight of the composition or less, about 0.2 percent by weight or less or about 0.1 percent by weight or less.

The cyclic (meth)acrylate esters contains a (meth)acryloyl radical bonded to a six-membered carbon ring, optionally containing a bridged ring. The cyclic (meth)acrylate esters may be polycyclic. As used herein polycyclic refers to compounds having more than one cyclic ring and incudes compounds having at least one cylic ring containing a bridged ring. Such monomers may include decahydronaphtyl (meth)acrylates, isobornyl (meth)acrylate, 2-norbornyl-methyl methacrylate, cyclohexyl (meth)acrylate and adamantyl (meth)acrylates, Such monomers may include decahydronaphtyl (meth)acrylates, isobornyl (meth)acrylate, 2-norbornylmethyl methacrylate, and adamantyl (meth)acrylates. The cyclic (meth)acrylate esters may be illustrated by the formula:

wherein $R^a$ is separately in each occurrence H or —CH$_3$; A is separately in each occurrence —CH$_2$—, —CH(CH$_3$)— or —C(CH$_3$)$_2$—; one or more M may be covalently bonded to any carbon of the cyclic rings and may be separately hydrogen, halogen, alkyl or alkylamino group, alkoxy group or a plurality thereof. Each M may be bonded to a carbon atom of the six-membered ring. There may be 0 to 4, 0 to 2, 0 to 1, or 0 of M present on the cyclic ring. c may be 0 or 1, c may be 1.

Non-limiting examples of the cyclic (meth)acrylate esters include isobornyl (meth)acrylate, bornyl (meth)acrylate, fenchyl (meth)acrylate, isofenchyl (meth)acrylate, norbornyl (meth)acrylate, cis, (endo) 3-methylamino-2-bornyl (meth)acrylate, 1,4,5,6,7,7-hexachlorobicyclo[2.2.1]-hept-5-ene-2-ol (meth)acrylate (HCBOMA) and 1,4,5,6,7,7-hexachlorobicyclo[2.2.1]-hept-5-ene-2 methanol (meth)acrylate (HCBMA), cyclohexyl (meth)acrylate, adamantyl (meth)acrylate, and mixtures of such bicyclic (meth)acrylates. The cyclic (meth)acrylate ester may be cyclohexyl (meth)acrylate, adamantyl (meth)acrylate, norbornyl methacrylate, isobornyl methacrylate or mixtures thereof. Non-limiting examples of the polycyclic (meth)acrylate esters include isobornyl (meth)acrylate, bornyl (meth)acrylate, fenchyl (meth)acrylate, isofenchyl (meth)acrylate, norbornyl (meth)acrylate, cis, (endo) 3-methylamino-2-bornyl (meth)acrylate, 1,4,5,6,7,7-hexachlorobicyclo[2.2.1]-hept-5-ene-2-ol (meth)acrylate (HCBOMA) and 1,4,5,6,7,7-hexachlorobicyclo[2.2.1]-hept-5-ene-2 methanol (meth)acrylate (HCBMA), adamantyl (meth)acrylate, and mixtures of such bicyclic (meth)acrylates. The cyclic (meth)acrylate ester may be, adamantyl (meth)acrylate, norbornyl methacrylate, isobornyl methacrylate or mixtures thereof. The cyclic (meth)acrylate ester may be isobernyl methacrylate. The cyclic (meth)acrylate esters are known per se and may be prepared in known fashion or may be obtained from commercial sources. The cyclic (meth)acrylates may be biobased compounds. Examples, of biobased monomers include, but are not limited to, isobornyl acrylate, isobornyl methacrylate, tetrahydrofurfuryl acrylate, tetrahydrofurfuryl methacrylate, and mixtures thereof. An example of an isobornyl acrylate includes SR506D (isobornyl acrylate) and an example of isobornyl (meth)acrylate includes SR423D (isobornyl methacrylate) (Sartomer Company; Exton, Pa.). An example of a tetrahydrofurfuryl acrylate includes SR285 (tetrahydrofurfuryl acrylate) and an example of a tetrahydrofurfuryl (meth)acrylate includes SR203 (tetrahydrofurfuryl methacrylate) (Sartomer Company). The Sartomer isobornyl acrylate SR506D contains 76.9% biobased carbon and the Sartomer tetrahydrofurfuryl acrylate SR285 contains 62.5% biobased carbon. The copolymers or polymerizable composition can have a biobased carbon content of 10 or greater weight percent based on the weight of the copolymer; of 12 or greater weight percent, 14 or greater weight percent, 16 or greater weight percent, 18 or greater weight percent, 20 or greater weight percent, 25 or greater weight percent, 30 or greater weight percent, 35 or greater weight percent, 40 or greater weight percent, 45 or greater weight percent, 50 or greater weight percent, 55 or greater weight percent, 60 or greater weight percent, 65 or greater weight percent, 70 or greater weight percent, 75 or greater weight percent, and up to 80 weight percent. The polymerizable composition or copolymer may contain a sufficient amount of cyclic (meth)acrylates to provide the desired biobased content, glass transition temperature as described herein, and level of one or more free/residual/unreacted monomers, such as unsaturated nitriles. The polymerizable compositions and copolymers disclosed herein contain cyclic (meth)acrylates in an amount of about 10 percent by weight of the polymerizable compositions or copolymers or greater, about 15 percent by weight or greater or about 20 percent by weight or greater. The polymerizable compositions and copolymers disclosed herein contain cyclic (meth)acrylates in an amount of about 80 percent by weight of the polymerizable compositions or copolymers or less, about 75 percent by weight or less, about 70 percent by weight or less, about 50 percent by weight or less, or about 40 percent by weight or less, or about 30 percent by weight or less.

The combined amount of vinylidene substituted aromatic compounds and cyclic or polycyclic (meth)acrylate esters in the copolymers is sufficient to provide the desired glass transition temperatures and optionally the desired transparencies. The combined amount of vinylidene substituted aromatic compounds and cyclic or polycyclic (meth)acrylate esters in the copolymers may be about 50 percent by weight or greater, about 70 percent by weight or about 80 percent by weight or greater based on the weight of the copolymer. The combined amount of vinylidene substituted aromatic compounds and cyclic or polycyclic (meth)acrylate esters in the copolymers may be about 100 percent by weight or less, about or about 90 percent by weight or less based on the weight of the copolymer.

The polymerizable composition and copolymers disclosed herein may further comprise one or more (meth) acrylates. (Meth) acrylate as used herein refers to compounds having a vinyl group bonded to the carbonyl moiety of an alkyl ester wherein the carbon of the vinyl group bonded to the carbonyl group further has a hydrogen or a methyl group bonded thereto. The term (meth) as used in this context refers to compounds having either of a hydrogen or methyl group on the carbon of the vinyl group bonded to the carbonyl group. Acrylate as used herein refers to compounds having a vinyl group bonded to the carbonyl moiety of an alkyl ester wherein the carbon of the vinyl group bonded to the carbonyl group further has a hydrogen. The use of alkyl acrylate means the compound referred to does not have a methyl group on the carbon adjacent to the carbonyl group, that is $R^a$ is hydrogen. The alkyl groups of the (meth) acrylates may have one or greater, two or greater, three or greater or four carbons in the alkyl group. The alkyl groups of the (meth)acrylates may have 30 or less, 10 or less, 6 or less or 4 or less carbons in the alkyl group. (Meth)acrylates useful include those that correspond to the formula:

wherein $R^a$ is separately in each occurrence H or —CH$_3$; and $R^b$ is separately in each occurrence an alkyl group that allows the (meth)acrylate form a homopolymer having a glass transition temperature of about 100° C. or greater. $R^b$ may be a C to C-30 alkyl group or $C_{1-10}$ alkyl group. $R^b$ may be a $C_2$ to $C_{-30}$ alkyl group, $C_{2-10}$ alkyl group, $C_{2-6}$ alkyl group or $C_{3-4}$ alkyl group. The (meth)acrylates may contain a mixture of (meth)acrylates such that for one (meth)acrylate $R^b$ is $C_1$ and for one or more other the other $R^b$ may be a $C_{2-33}$ alkyl group, $C_{2-10}$ alkyl group, $C_{2-6}$ alkyl group or $C_{3-4}$ alkyl group The one or more (meth)acrylates may include include methyl (meth)acrylate and one or more of ethyl (meth)acrylate, propyl (meth)acrylate, butyl (meth)acrylate, pentyl (meth)(acrylate) and hexyl (meth) acrylate. Examples of the one or more (meth)acrylates include lower alkyl (meth)acrylates, such as methyl (meth)acrylate, ethyl (meth) acrylate, propyl (meth)acrylate, butyl (meth)acrylate, pentyl (meth)(acrylate) and hexyl (meth) acrylate. The (meth) acrylates may be one or more straight chain $C_8$ to $C_{16}$ alkyl acrylates based on the weight of the copolymers. The one or more (meth)acrylates may include include methyl (meth) acrylate and one or more of ethyl (meth)acrylate, propyl (meth)acrylate, butyl (meth)acrylate, pentyl (meth)(acrylate) and hexyl (meth) acrylate. The one or more (meth) acrylates may include methyl (meth)acrylate and butyl (meth)acrylate. The one or more (meth)acrylates in the polymerizable composition may be present in sufficient amount to provide the desired properties of the copolymer such as processability, practical toughness, refractive index, biobased content, scratch resistance, environmental stress crack resistance, hydrolytic stability, thermal stability, UV stability, impact resistance, weatherability, and the like. The polymerizable compositions and copolymers disclosed herein contain (meth)acrylates in an amount of about 0 percent by weight of the polymerizable compositions or copolymers or greater, about 1 percent by weight or greater, about 2 percent by weight or greater, 5 percent by weight or greater, 10 percent by weight or greater, 20 percent by weight or greater or 30 percent by weight or greater. The polymerizable compositions and copolymers disclosed herein contain (meth)acrylates in an amount of about 60 percent by weight of the polymerizable compositions or copolymers or less, about 55 percent by weight or less, about 50 percent by weight or less, about 40 percent by weight or less or about 30 percent by weight or less. Wherein the copolymer contains one or more straight chain $C_8$ to $C_{16}$ alkyl acrylates based on the weight of the copolymers they may be present in an amount from about 0.1 to about 10 weight percent. The one or more $C_{2-8}$ alkyl acrylates are present to improve the processability of the copolymers prepared. The one or more alkyl acrylates may be a $C_{2-4}$ acrylate or butyl acrylate. The one or more $C_{2-8}$ alkyl acrylates are present in a sufficient amount to improve the processability of the copolymers prepared. The one or more $C_{2-8}$ alkyl acrylates may be present in an amount of about 1.0 percent by weight of the polymerization composition or copolymers or greater, about 5 percent or greater or about 10 percent by weight or greater. The one or more $C_{2-8}$ alkyl acrylates may be present in an amount of about 30 percent by weight of the polymerization composition or copolymers or less, about 25 percent or less or about 20 percent by weight or less.

The polymerizable composition and copolymers disclosed herein may further comprise one or more unsaturated nitriles. Unsaturated nitriles include, but are not limited to, acrylonitrile, methacrylonitrile, ethacrylonitrile, fumaronitrile and mixtures thereof. The unsaturated nitrile may be acrylonitrile. The unsaturated nitriles are used in the polymerizable compositions and copolymers to enhance the glass transition temperature, transparency, chemical resistance and the like. The polymerizable compositions and copolymers disclosed herein contain one or more unsaturated nitriles in an amount of about 0 percent by weight of the polymerizable compositions or copolymers or greater, about 1 percent by weight or greater, about 2 percent by weight or greater, about 5 percent by weight or greater or about 10 percent by weight or greater. The polymerizable compositions and copolymers disclosed herein may contain one or more unsaturated nitriles in an amount of about 40 percent by weight of the polymerizable compositions or copolymers or less, about 35 percent by weight or less, about 30 percent by weight or less, about 25 percent by weight or less or about 20 percent by weight or less.

Other vinyl monomers may also be included in the polymerizable composition and copolymer, in sufficient amount to provide the desired properties as disclosed herein, including conjugated 1,3 dienes (for example butadiene, isoprene, etc.); alpha- or beta-unsaturated monobasic acids and derivatives thereof (for example, acrylic acid, methacrylic acid, etc.); vinyl halides such as vinyl chloride, vinyl bromide, etc.; vinylidene chloride, vinylidene bromide, etc.; vinyl esters such as vinyl acetate, vinyl propionate, etc.; ethylenically unsaturated dicarboxylic acids and anhydrides and derivatives thereof, such as maleic acid, fumaric acid, maleic anhydride, dialkyl maleates or fumarates, such as dimethyl maleate, diethyl maleate, dibutyl maleate, the corresponding fumarates, N-phenyl maleimide (N-PMI), etc.; and the like. These additional comonomers can be incorporated in to the composition in several ways including, interpolymerization with the vinylidene substituted aromatic containing copolymer and/or polymerization into polymeric components which can be combined, for example blended in to the matrix. If present, the amount of such comonomers may be equal to or less than about 20 weight percent, equal to or less than about 10 weight percent or equal to about 5 weight percent based on the total weight of the polymeric composition. Such co-monomers may be present in an amount of about 1 percent by weight or greater.

The compositions disclosed may contain impact modifiers. The terms impact modifiers and rubbers are used interchangeably herein. Various impact modifiers may be used in the compositions disclosed; such as diene rubbers, ethylene propylene rubbers, ethylene propylene diene (EPDM) rubbers, ethylene copolymer rubbers, acrylate rubbers, polyisoprene rubbers, silicon rubbers, silicon-acrylate rubbers, polyurethanes, thermoplastic elastomers, halogen containing rubbers, and mixtures thereof. Also suitable are interpolymers of rubber-forming monomers with other copolymerizable monomers. The rubbers may be present in the formulated composition in sufficient amount to provide the desired impact properties to the composition. Desired impact properties include increased izod, charpy, gardner, tensile, falling dart, and the like. The compositions disclosed herein contain impact modifiers (rubbers) in an amount of about 0.5 percent by weight of the compositions or greater, about 1 percent by weight or greater or about 2 percent by weight or greater. The compositions disclosed herein contain impact modifiers (rubbers) in an amount of about 50 percent by weight of the compositions or less, about 45 percent by weight or less, about 40 percent by weight or less, about 30 percent by weight or less, about 20 percent by weight or less or about 10 percent by weight or less. The compositions disclosed herein contain the copolymer in an amount of about 0.5 percent by weight of the compositions or greater. The compositions disclosed herein contain copolymer in an amount of about 99.5 percent by weight of the compositions or less, 90 percent by weight of the compositions or less, 80 percent by weight of the compositions or less or 50 percent by weight of the compositions or less. Compositions, formulated compositions, as used in this context are the formulated compositions containing all the ingredients for the intended use.

The rubbers may be diene rubbers such as polybutadiene, polyisoprene, polypiperylene, polychloroprene, and the like or mixtures of diene rubbers, that is, any rubbery polymers of one or more conjugated 1,3-dienes, such as 1,3-butadiene. Such rubbers include homopolymers of 1,3-butadiene and copolymers of 1,3-butadiene with one or more copolymerizable monomers, such as vinylidene substituted aromatic (styrene). The diene rubber may be the homopolymer of 1,3-butadiene. Exemplary copolymers of 1,3-butadiene are block or tapered block rubbers of at least about 30 weight percent 1,3-butadiene, from about 50 weight percent, from about 70 weight percent, or from about 90 weight percent 1,3-butadiene and up to about 70 weight percent vinylidene substituted aromatic monomer, up to about 50 weight percent, up to about 30 weight percent, or up to about 10 weight percent vinylidene substituted aromatic monomer, weights based on the weight of the 1,3-butadiene copolymer.

The impact modifiers employed may be those polymers and copolymers which exhibit a second order transition temperature, sometimes referred to as the glass transition temperature (Tg), for the diene fragment which is not higher than 0° C. or not higher than −20° C. as determined using conventional techniques, for example ASTM Test Method D 746-52 T. Tg is the temperature or temperature range at which a polymeric material shows an abrupt change in its physical properties, including, for example, mechanical strength. Tg can be determined by differential scanning calorimetry (DSC). The diene rubber may have a weight-average molecular weight equal to or less than about 900 kg/mole or a weight average molecular weight equal to or less than 600 kg/mole. The diene rubber may have a solution viscosity of at least 10 centi Stokes (cSt) (10 percent (%) solution in styrene) or a solution viscosity of about 30 cSt. The diene rubber may have a solution viscosity equal to or less than about 500 cSt or equal to or less than about 400 cSt. The rubber, with graft and/or occluded polymers if present, is dispersed in the continuous matrix phase as discrete particles. The rubber particles may comprise a range of sizes having a mono-modal, bimodal, or multimodal distribution. The average particle size of a rubber particle, as used herein, will, refer to the volume average diameter. In most cases, the volume average diameter of a group of particles is the same as the weight average. The average particle diameter measurement generally includes the polymer grafted to the rubber particles and occlusions of polymer within the particles. Unless otherwise specified, the rubber particle sizes disclosed and claimed herein are determined on a Coulter Multisizer II or II e with the ACCUCOMP™ Software Version 2.01. by the following method: about 3 granules of polymer samples (30-70 mg) are dissolved in 5 milliliters (ml) of Dimethyl Formamide (DMF), using an ultrasonic bath for agitation for approximately 15 to 20 minutes. 10 ml or an electrolyte solution (1 percent of $NH_4SCN$ in DMF) is mixed with 0.2 ml of the sample solution. The coulter measuring stand is used with 20 micrometer Coulter tube and a 1.16 micrometer calibration material. The coincidence level indicator of the apparatus should read between 5 and 10 percent. If the reading is above 10 percent, dilute the sample in a beaker with electrolyte solution, or if it is too low, add more drops of the polymer solution in DMF. The volumetric mean particle size is reported. The average particle size of the rubber particles may be equal to or greater than about 0.05 micrometers (microns) (µm), equal to or greater than about 0.1 micrometers, and about 0.5 micrometers. The average particle size of the rubber particles may be equal to or less than about 10 micrometers, preferably equal to or less than about 5 micrometers, or equal to or less than about 4 micrometers.

The disclosed compositions may also optionally contain one or more additives that are commonly used in compositions of this type. The disclosed compositions may also optionally contain one or more additives that are commonly used in compositions useful for molding structures. Such additives of this type include, but are not limited to: ignition resistant additives, stabilizers, colorants, antioxidants, anti-stats, silicon oils, flow enhancers, mold releases, etc. Additionally, ignition resistance additives, such as, but not limited to halogenated hydrocarbons, halogenated carbonate oligomers, halogenated diglycidyl ethers, organophosphorous compounds, fluorinated olefins, antimony oxide and metal salts of aromatic sulfur, or a mixture thereof may be used. Compounds which stabilize mass polymerized rubber-modified vinylidene substituted aromatic copolymer compositions against degradation caused by, but not limited to heat, light, and oxygen, or a mixture thereof may be used. Fillers and reinforcements may also be present. Exemplary fillers include talc, clay, wollastonite, mica, glass or a mixture thereof.

If used, such additives and/or fillers may be present in the formulated compositions in an amount about 0.01 percent by weight or greater, about 0.1 percent by weight or greater, about 1 percent by weight or greater, about 2 percent by weight or greater, or about 3 percent by weight or greater based on the weight of the compositions. The additives and/or fillers may be present in an amount of about 40 percent by weight or less, about 30 percent by weight or less, about 20 percent by weight or less, about 15 percent by weight or less, about 10 percent by weight or less, about 5 percent by weight or less based on the weight of the composition. The additives may be present in amounts up to 5 weight percent while fillers, fibers and beads may be present in amounts up to 40 weight percent based on the weight of the compositions.

The disclosed compositions may comprise the copolymers and additives as disclosed herein. The additives may optionally be fillers, reinforcing fiber; glass ceramic or thermoplastic beads; and or mold release agents. The fibers may be glass fibers, carbon fibers (including carbon nano structures), metal fibers, metal coated fibers, polymeric fibers (thermoset fibers or thermoplastic fibers). Polymeric fibers may comprise one or more polymers selected from aramids, polyesters, polyolefins, polyethylene amines, and the like. The beads may be ceramic or glass. The beads may be hollow or solid.

The mold release agent can be selected from any known ones, including, for example, polyethylene waxes, silicone oils, long-chain carboxylic acids, and metal salts of long-chain carboxylic acids, such as stearates. The mold reelase agents may be one or more of at least one of higher fatty acids and at least one of metal salts of higher fatty acids, (calcium stearate or zinc stearate). Suitable mold release agent are stearic acids, stearyl alcohol, stearic esters, and generally higher fatty acids, derivatives of these, and corresponding fatty acid mixtures having from 12 to 30 carbon atoms. The amount of mold release agents may be in the range from 0.05 weight percent or greater based on the total weight of the disclosed compositions or about 0.1 percent by weight or greater. The amount of mold release agents may be in the range from 5.0 weight percent or less based on the total weight of the disclosed compositions, about 2 percent by weight or less or about 1.0 percent by weight or less. Various techniques for producing the copolymers are disclosed. Examples of these known polymerization processes include bulk, mass-solution, or mass-suspension polymerization, generally known as mass polymerization processes. For a good discussion of how to make monovinylidene aromatic copolymer containing compositions see "Modern Styrenic Polymers" of Series In Polymer Science (Wiley), Ed. John Scheirs and Duane Priddy, ISBN 0 471 497525. Also, for example, U.S. Pat. Nos. 3,660,535; 3,243,481; and 4,239,863, which are incorporated herein by reference. Continuous mass polymerization techniques are advantageously employed in preparing the copolymers. The polymerization may conducted in one or more substantially linear, stratified flow or so-called "plug-flow" type reactors such as described in U.S. Pat. No. 2,727,884, sometimes referred to as multizone plug flow bulk process, which may or may not comprise recirculation of a portion of the partially polymerized product or, alternatively, in a stirred tank reactor wherein the contents of the reactor are essentially uniform throughout, which is generally employed in combination with one or more plug-flow type reactors. The stirred tank reactors can be boiling and/or coil reactors. Such reactors can be used in series. Processes for use of the stirred tank reactors for preparing copolymers are disclosed in *Modern Styrenic Polymers*, Edited by John Schiers and Duane Priddy, Wiley, ISBN 0 471 49752 5, published in 2003, see pp 43-72, relevant portions incorporated herein by reference. Alternatively, a parallel reactor set-up, as taught in EP 412801, may also be suitable for preparing the copolymers, relevant portions are incorporated herein by reference.

Multizone plug flow bulk processes include a series of polymerization vessels (or towers), consecutively connected to each other, providing multiple reaction zones. A mixture of monomers used to prepare the copolymer is formed and then fed into the reaction system. A rubber, for example butadiene rubber may be dissolved in the mixture monomers before being fed into the reaction system. The polymerization can be thermally or chemically initiated, and viscosity of the reaction mixture will gradually increase. During the reaction course, where present, the rubber may become grafted with the copolymer and, in the rubber solution, bulk copolymer (referred to also as free copolymer or matrix copolymer or non-grafted copolymer) is also formed. At a point where the free copolymer cannot be "held" in one single, continuous "phase" of rubber solution, it begins to form domains of copolymer dissolved in monomer and solvent. The polymerization mixture now is a two-phase system. As polymerization proceeds, more and more free copolymer is formed, and the rubber phase starts to disperse itself (rubber domains) in the matrix of the ever-growing free copolymer phase. Eventually, the free copolymer becomes a continuous phase. Some copolymer is occluded inside the rubber particles as well. Pre-phase inversion means that the rubber solution is a continuous phase and that no rubber particles are formed, and post phase inversion means that substantially all of the rubber phase has converted to rubber domains and there is a continuous copolymer phase. Following the phase inversion, more matrix copolymer may be formed A feed with a functional monomer such as N-phenyl maleimide that increases the Tg of the matrix and also the heat resistance of the product can be added in one or more location throughout the polymerization process, the location(s) may be the same or different from where the co-monomers are added, for example see U.S. Pat. Nos. 5,412,036 and 5,446,103, which are incorporated herein by reference.

A feed with a functional additive such as ethylenebisstearamide, dialkyladipates, polydimethylsiloxane, or other lubricants or release agents that increases the processability of the product can be added in one or more location throughout the polymerization, devolatization and conveying process, the location(s) may be the same or different from where the co-monomers are added.

When a desirable monomer conversion level and a matrix copolymer of desired molecular weight distribution is obtained, where rubber is present, the polymerization mixture may then be subjected to conditions sufficient to crosslink the rubber and remove any unreacted monomer and solvent. Such cross-linking and removal of unreacted monomer, as well as removal of diluent or solvent, if employed, and other volatile materials is advantageously conducted employing conventional devolatilization techniques, such as introducing the polymerization mixture into a devolatilizing chamber, flashing off the monomer and other volatiles at elevated temperatures, for example, from 130° C. to 300° C. and/or under vacuum and removing them from the chamber. Thereafter the polymer may be extruded, and bulk pellets obtained from a pelletizer.

The temperatures at which polymerization is conducted are dependent on a variety of factors including the specific initiator and type and concentration of rubber, comonomers, reactor set-up (for example, linear, parallel, recirculation, etc.), and reaction solvent, if any, employed. Polymerization temperatures from 60° C. to 160° C. may be employed prior to phase inversion with temperatures from 100° C. to 200° C. being employed subsequent to phase inversion. Mass polymerization at such elevated temperatures is continued until the desired conversion of monomers to polymer is obtained. Generally, conversion (also sometimes referred to as percent solids) of from 55 to 90, or 60 to 85, weight percent of the monomers added to the polymerization system (that is, monomers added in the feed and any additional stream, including any recycle stream) to polymer is desired. Percent solids is the ratio of the weight of the solids (for example, rubber plus matrix (co)polymer) to the weight of the reaction mixture (for example, unpolymerized monomer(s)) expressed in percent at any specified time during the polymerization reaction.

The monomers and optionally rubber or rubber precursors in the reaction mixture may be dissolved or dispersed in an inert solvent. Useful solvent families are aromatics, ketones, alkanes. An exemplary solvent is ethyl benzene. The solids level of monomers and rubbers or rubber precursors in the solvent may be chosen to facilitate efficient formation of the copolymer and optionally dispersed rubber in the copolymer. Solids level as used in this context is the amount of the monomers and optionally rubber in the reaction mixture expressed as weight percent. The solids level of monomers and optionally rubber or rubber precursors in the reaction mixture is about 60 percent by weight or greater based on the reaction mixture, is about 65 percent by weight or greater or is about 70 percent by weight or greater. The solids level of monomers and optionally rubber or rubber precursors in the reaction mixture is about 95 percent by weight or less based on the reaction mixture, is about 90 percent by weight or less or is about 85 percent by weight or less.

The residence time of the reaction mixture in the reactors is sufficient to prepare copolymers having the desired molecular weight. The residence time of the reaction mixture in the reactors may be about 1 hour or greater, about 1.5 hours or greater or about 2 hours or greater. The residence time of the reaction mixture in the reactors may be about 10 hours or less, about 9 hours or less or about 8 hours or less. The molecular weight of the copolymer may be about 120,000 g/Mole or greater, about 130,000 g/Mole or greater or about 140,000 g/Mole or greater. The molecular weight of the copolymer may be about 400,000 g/Mole or less, about 350,000 g/Mole or less or about 325,000 g/Mole or less. Molecular weight is determined by gas permeation chromatography using polystyrene standards. The copolymers exhibit a transparency of about 85 percent by weight or greater, 86 percent by weight or greater or about 87 percent by weight or greater. The copolymers exhibit a glass transition temperature of 100° C. or greater, about 110° C. or greater, about 120° C. or greater, or about 125° C. or greater. The copolymers exhibit a glass transition temperature of about 145° C. or less or about 140° C. or less. The copolymers containing dispersed rubber may be opaque or clear provided the ratio of the one or more monovinylidene aromatic compounds to the one or more cyclic (meth) acrylate esters is in an acceptable range. Where the ratio of the one or more vinylidene substituted aromatic compounds to the one or more cyclic (meth)acrylate esters is about 4:1 to about 1:4 the composition exhibits a transparency of about 85 percent by weight or greater.

The process may be performed in the presence of a radical initiator. Any radical initiator that enhanced the formation of the copolymers may be used. Exemplary classes of initiators include free radical initiators such as peroxide and azo compounds which will accelerate the polymerization of the vinyl aromatic monomer. Exemplary initiators include but are not limited to tertiary butyl peroxyacetate, dibenzoyl peroxide, dilauroyl peroxide, t-butylhydroperoxide, ditertiary-butylperoxide, cumene hydroperoxide, dicumylperoxide, 1,1-bis(tertiary-butylperoxy)-3,3,5-trimethyl-cyclohexane, t-butylperoxybe nzoate, 1,1-bis(t-butylperoxy)-cyclohexane, benzoylperoxide, succinoylperoxide and t-butylperoxypivilate, and azo compounds such as azobisisobutyro-nitrile, azobis-2,4-dimethylvaleronitrile, azobiscyclohexanecarbo-nitrile, azobismethyl isolactate and azobiscyanovalerate. Typical amounts are well known in the art and may be used in the disclosed process. The radical initiators may be utilized in a sufficient amount to enhance the polymerization of the monomers to form a copolymer, including increasing the rate of polymerization. Initiators may be employed in a range of concentrations dependent on a variety of factors including the specific initiators employed, the desired levels of polymer grafting and the conditions at which the mass polymerization is conducted, such as from 50 to 2000, preferably from 100 to 1500, parts by weight of the initiator are employed per million parts by weight of monomers. The radical initiators may be present in an amount of about 0.001 percent by weight or greater based on the weight of the monomers present, about 0.002 percent by weight or greater or about 0.003 percent by weight or greater. The radical initiators may be present in an amount of about 0.1 percent by weight or less based on the weight of the co-monomers present, about 0.08 percent by weight or less or about 0.05 percent by weight or less.

The copolymers disclosed may be blended with thermoplastic polymers. The thermoplastic polymers may be any thermoplastic polymers which form a useful blend with the copolymers. The thermoplastic polymers can be any polymers that are transparent. Exemplary thermoplastic polymers include poly(meth)acrylates, polycarbonates, polyesters, polymers containing vinylidene substituted aromatic monomers, and the like. Examples of the thermoplastic polymers include polymethyl methacrylate, polystyrene, acrylonitrile-butadiene-styrene, styrene acrylonitrile, polybutyl acrylate, and the like. The amount of the copolymers disclosed and other thermoplastic polymers are chosen to provide the desired properties. The amount of copolymers disclosed in the blend may be about 99.5 percent by weight or less based on the weight of the blend, about 70 percent by weight or less or about 60 percent by weight or less. The amount of copolymers disclosed in the blend may be about 50 percent by weight or greater based on the weight of the blend or about 60 percent by weight or greater. The amount of thermoplastic polymers disclosed in the blend may be about 50 percent by weight or less based on the weight of the blend, about 40 percent by weight or greater or about 30 percent by weight or greater. The amount of thermoplastic polymers disclosed in the blend may be about 0.5 percent by weight or greater based on the weight of the blend, about 10 percent by weight or greater or about 30 percent by weight or greater. The blends may be formed my mixing or extrusion.

The compositions disclosed may be produced by mixing the components in a known manner and melt-compounding and/or melt-extruding them at temperatures wherein the copolymers, and optionally polymers blended therewith at temperatures above the glass transition temperatures of the components. Such temperatures may be about 100° C. or greater or 140° C. or greater. Such temperatures may be about 250° C. or less, about 200° C. or less or about 180° C. or less. The blending can be performed in conventional units such as internal kneaders, extruders and twin-screw extruders. The individual components may be mixed in a known manner both in succession and simultaneously and both at approximately 23° C. (room temperature) and at a higher temperature. The compositions may be formed into beads, structures or sheets. The beads may be utilized in molding desired structures as disclosed herein. The sheets may be shaped into structures, for instance by thermoforming. The structures may be formed by passing the molten material through dies to form a shape transverse to the extrusion direction.

The copolymers and copositions exhibiting high glass transition temperatures, opacity or transparency may be used in a number of applications of polymeric systems, including packaging (food packaging), medical, electronic, optical, appliance, toy and automotive applications.

The pellets of the formulated composition may be extruded to form sheets. The sheets may be thermoformed into shaped articles. Alternatively, the formulated compositions may be molded into articles.

Illustrative Embodiments

The following examples are provided to illustrate the invention, but are not intended to limit the scope thereof. All parts and percentages are by weight unless otherwise indicated.

Figure 1:
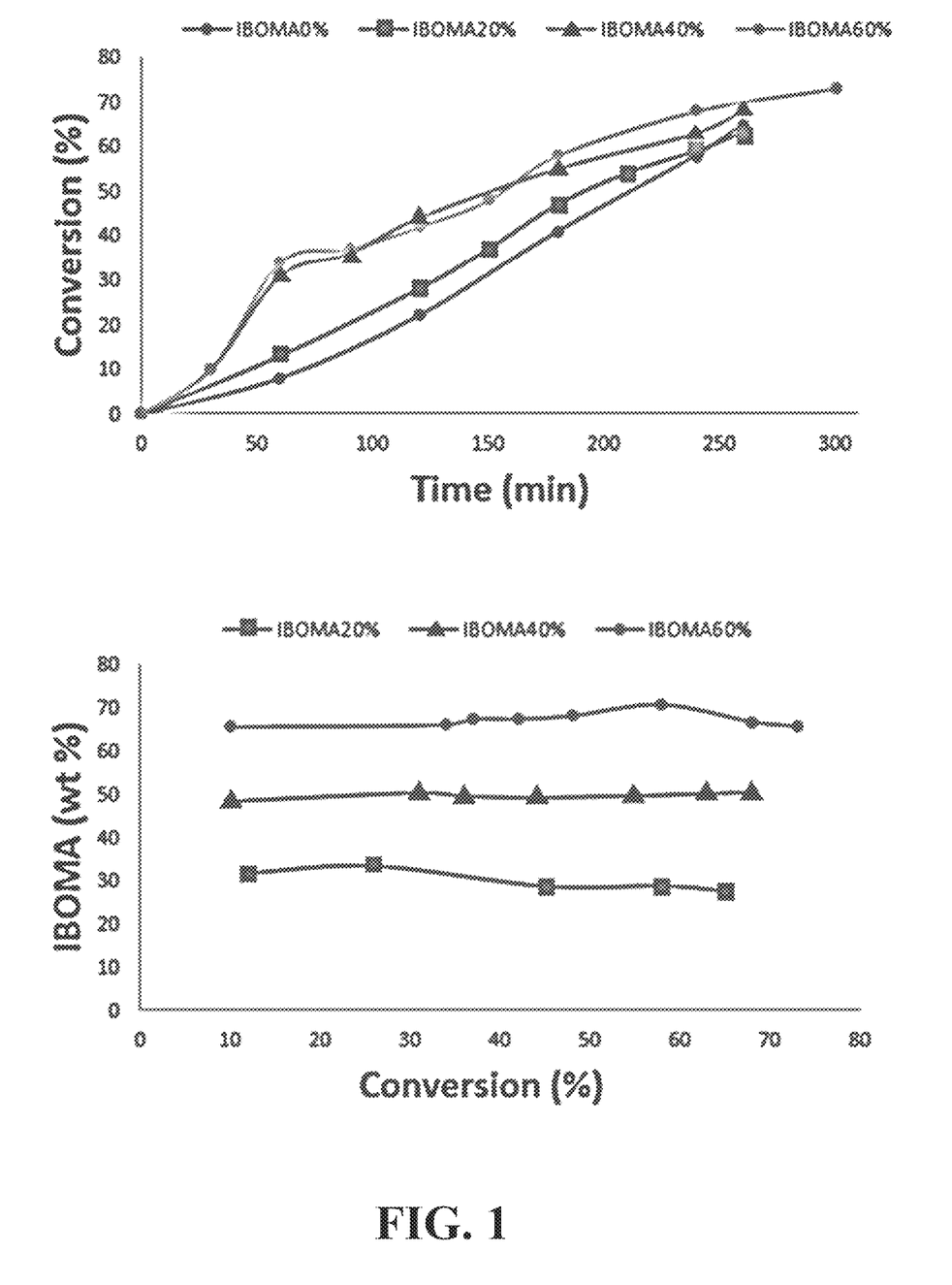
FIG. 1 is Time and Conversion plots for Styrene-isobornyl methacrylate copolymers at different isobornyl methacrylate contents (left) and isobornyl methacrylate content in the polymer at different conversion levels (right)
Figure 2:
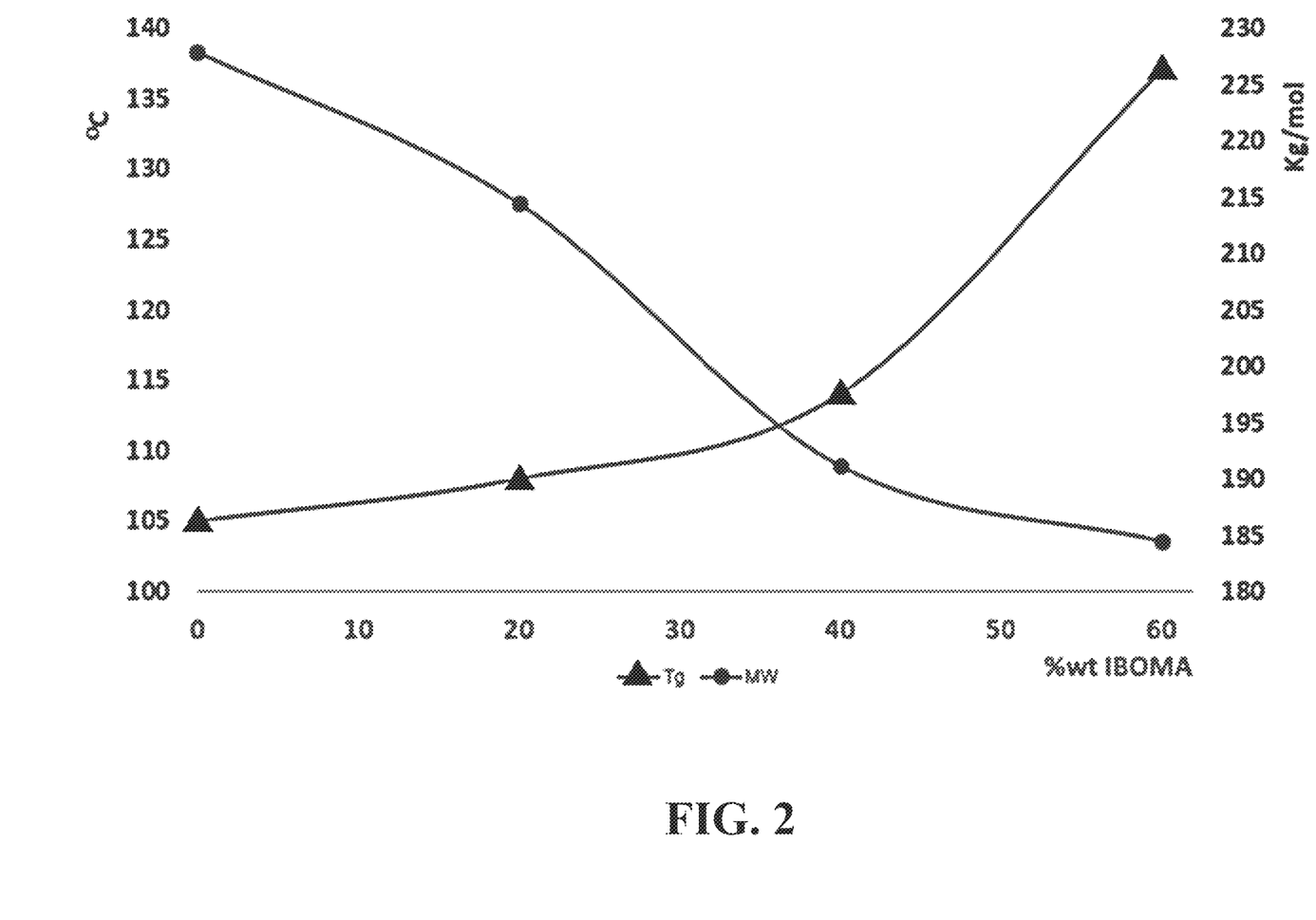
FIG. 2 shows the change in molecular weight and Tg of the copolymer with changing isobornyl methacrylate content.

Styrene (STY) and isobornyl methacrylate (IBOMA) are copolymerized in batch reactor. IBOMA content in the feed is selected to be 20, 40 and 60 weight percent respectively. During the polymerization, intermediate samples with different conversions are taken and submitted to the analytical lab. Results indicate that the conversion is around 65 percent for all compositions after 4 hours and there was no composition drift during this period of time (FIG. 1). Increasing the IBOMA fraction in the polymer chain results in a decrease of molecular weight (Mw) and an increase in Tg of the copolymer, as illustrated in FIG. 2.

Polymers prepared in the batch reactor are subjected to injection molding. All three polymers are transparent. Increasing the IBOMA fraction makes polymer more brittle and the polymer with 60 weight percent IBOMA produced the most brittle tensile bars which are difficult to mold. General purpose polystyrene GPPS and styrene-acrylonitrile (SAN) are also synthesized in the batch reactor and injection molded to compare the disclosed samples. Slight discoloration is observed in all polymer samples.

Figure 3:
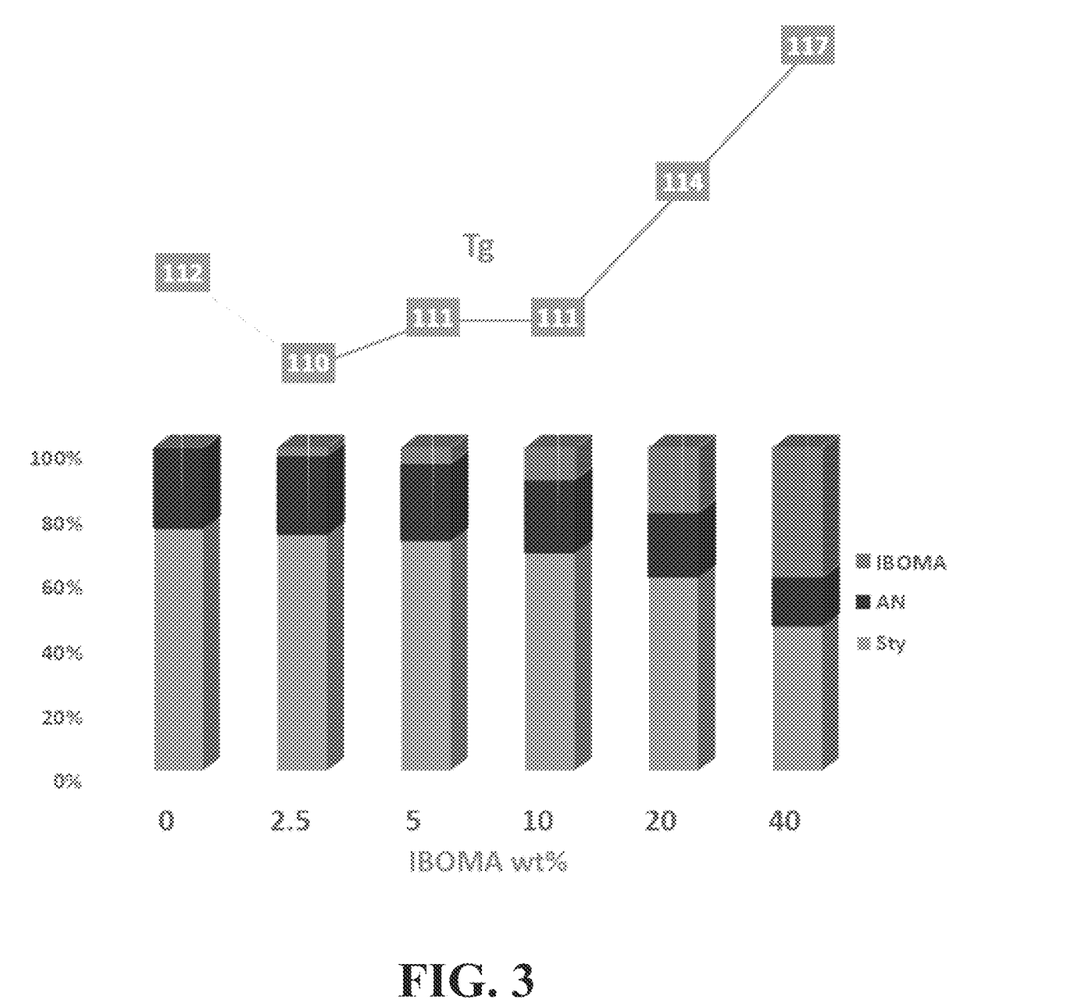
FIG. 3 shows the change in Tg with changing IBOMA content in Styrene-Isobornyl methacrylate-acrylonitrile copolymers.

STY and AN are copolymerized with IBOMA in small vials (<10 g) varying IBOMA content between 2.0 and 42 weight percent. DSC analysis showed that increase in Tg of the copolymer becomes significant when IBOMA content is higher than 10 weight percent (FIG. 3).

STY-AN-NPMI and STY-NPMI polymers containing 2.5 weight percent and 5 weight percent NPMI (N-phenyl-maleimide) are synthesized using the same conditions to compare the heat boosting effect of IBOMA and NPMI. Data showed that IBOMA increases the Tg of polymer but not as efficiently as NPMI (1° C. per 1 weight percent). The polymers amounts of monomers and the residual monomer contents of some samples are listed in Table 1.

index of rubber phase for optimum transparency. In the literature the refractive index of IBOMA is reported to be the same as PMMA (1.4903). The refractive index of PS is reported as 1.590 of butadiene rubber (BTD) is 1.538 and 70/30 STY-Butadiene block rubber (STY-BTD, 1.516) are known from earlier reports. Therefore STY/IBOMA ratio for a transparent, impact modified STY-IBOMA polymer may be 1/3 if butadiene rubber is used, and 1/1.17 if block rubber is used. Sty and IBOMA are copolymerized in ethyl benzene (EB) in the presence of butadiene. The IBOMA content in the feed was selected to be 20 and 40 weight percent. The copolymer content, molecular weight and residual monomer content is shown in Table 2.

| Polymer | IBOMA20-AF50 | IBOMA20-AF50 | IBOMA40-AF50 | IBOMA40-BR |
|---|---|---|---|---|
| Feed | | | | |
| Sty | 57.6 | 64.8 | 48.6 | 48.6 |
| IBOMA | 14.4 | 16.2 | 32.4 | 32.4 |
| EB | 20 | 10 | 10 | 10 |
| Rubber | 8 | 9 | 9 | 9 |
| Rubber type | AF50 | AF50 | AF50 | Block |
| Molecular weight (kg/mol) | | | | |
| Mn | 49 | 72 | 82 | 78 |
| Mw | 140 | 183 | 194 | 197 |
| RPS | 1.4 | 1.1 | 2 | 2.4 |
| Residuals (ppm) | | | | |
| EB | 130 | 30 | 0 | 12 |
| Sty | 110 | 16 | 18 | 28 |
| IBOMA | 1200 | 144 | 1211 | 1363 |

AF 50 is a low cis polybutadiene rubber with a Mooney viscosty of 55

Molded structures of STY-IBOMA-BTD that contains 40 weight percent IBOMA (Sty/IBOMA: I/O.66) becomes opaque with butadiene rubber and semi-transparent with block rubber. Once the IBOMA content is increased to have STY/IBOMA: 1/3 Btd rubber containing polymer the molded structures becomes semi-transparent. These results show transparency can be obtained and further tuned for STY-IBOMA-BTD (BTD butadiene) copolymers. The boiling point of IBOMA monomer is 258° C. is much higher than that of STY (145° C.) and ethylbenzene (136° C.). STY-IBOMA (IBOMA: 40 weight percent) is synthesized in

TABLE 1

| | Heat resistance (DSC) | | Molecular weight (GPC) | | | Composition (IR) | | | Residual monomer (GC) | |
|---|---|---|---|---|---|---|---|---|---|---|
| Polymer | Tg (° C.) | Mw (kDa) | Mn (kDa) | PDI | AN (wt %) | STY (wt %) | IBOMA (wt %) | NPMI (wt %) | STY (ppm) | IBOMA (ppm) |
| STY-AN | 112.3 | 401 | 144 | 2.78 | 25.0 | 75.0 | — | — | 120 | — |
| STY-AN-NPMI | 114.5 | 372 | 143 | 2.61 | 24.0 | 73.6 | — | 2.4 | — | — |
| STY-AN-NPMI | 117.2 | 368 | 141 | 2.62 | 22.7 | 72.4 | — | 4.9 | — | — |
| STY-AN-IBOMA | 110.5 | 379 | 129 | 2.94 | 24.6 | 74.2 | 2.13 | — | 1500 | 450 |
| STY-AN-IBOMA | 111.0 | 378 | 127 | 2.97 | 23.4 | 73.7 | 4.16 | — | 950 | 880 |
| STY-AN-IBOMA | 111.5 | 366 | 119 | 3.06 | 21.7 | 68.0 | 10.3 | — | — | — |
| STY-AN-IBOMA | 114.1 | 344 | 108 | 3.17 | 18.4 | 60.3 | 21.3 | — | — | — |
| STY-AN-IBOMA | 117.4 | 280 | 79 | 3.53 | 12.4 | 46.0 | 41.6 | — | — | — |

Polybutadiene rubber is added, to improve impact modification on STY-IBOMA polymers, into the feed allowing grafting/sizing and cross linking of the rubber. IBOMA has a refractive index lower than PS and rubber. The refractive index of the rigid phase can thus be matched to the refractive the batch reactor and several different oven conditions are and the residual amount of IBOMA and styrene are measured.

The results are compiled in Table 3. The results reveal that residual IBOMA has a significant effect on Tg. Increasing level of residual IBOMA in produced polymer lowers the Tg compared. In order to evaporate unreacted IBOMA, 225° C. is a good temperature.

TABLE 3

| Description | Temp (° C.) | Time (h) | Wt (g) | Tg (° C.) | Res. IBOMA (%) | Res. STY (ppm) | Mn (kDa) | Mw (kDa) | PDI |
|---|---|---|---|---|---|---|---|---|---|
| Vacuum oven | 225 | 1 | 200 | 118.4 | 1.2 | 30 | 86.2 | 190.6 | 2.21 |
|  | 225 | 2 | 200 | 121.1 | 0.68 | 20 | 83.7 | 186.6 | 2.23 |
|  | 225 | 3 | 200 | 121.3 | 0.59 | 20 | 83.6 | 184.0 | 2.20 |
|  | 250 | 1 | 200 | 119.8 | 0.93 | 60 | 77.5 | 179.5 | 2.32 |
|  | 250 | 2 | 200 | 121.2 | 0.70 | 130 | 77.1 | 179.7 | 2.33 |
|  | 250 | 3 | 200 | 119.7 | 0.54 | 170 | 81.1 | 183.0 | 2.26 |
|  | 250 | 1 | 50 | 116.4 | 1.40 | 100 | 79.0 | 179.5 | 2.27 |
|  | 250 | 2 | 50 | 117.7 | 1.37 | 80 | 76.5 | 173.9 | 2.27 |
|  | 250 | 3 | 50 | 120.3 | 1.39 | 80 | 77.9 | 178.4 | 2.29 |
| Precipitation | — | — | 10 | 126.4 | 0.06 | 0 | 86.9 | 193.9 | 2.23 |

What is claimed is:

1. A composition, comprising at least one or more impact modifiers and at least one copolymer comprising:
    a) from about 20 to about 90 percent by weight of one or more vinylidene substituted aromatic compounds;
    b) from about 10 to about 80 percent by weight of one or more polycyclic (meth)acrylate esters;
    c) from about 0 to about 40 percent by weight of one or more unsaturated nitriles; and
    d) from about 0 to 60 percent by weight of one or more alkyl (meth)acrylates;
    wherein the weight percentage is based on the weight of the copolymer and the copolymer has a weight average molecular weight of about 120,000 g/mole or greater and a glass transition temperature of about 100° C. or greater wherein the molecular weight is determined by gel permeation chromatography using polystyrene standards and the glass transition temperature is determined using differential scanning calorimetry.

2. The composition of claim 1 wherein the copolymer contains from about 50 percent to about 90 percent by weight of one or more vinylidene substituted aromatic compounds and one or more polycyclic (meth)acrylate esters.

3. The composition of claim 1 wherein the copolymer contains from about 70 percent to about 90 percent by weight of one or more vinylidene substituted aromatic compounds and one or more polycyclic (meth)acrylate esters.

4. The composition according to claim 1 wherein the copolymer contains from about 0.1 to about 10 weight percent of one or more straight chain $C_8$ to $C_{16}$ alkyl acrylates based on the weight of the copolymers.

5. The composition according to claim 1 comprising from about 20 to about 95 percent by weight of the copolymer and from about 0.5 to about 50 percent by weight of the impact modifier based on the weight of the composition.

6. The composition according to claim 1 which comprises a continuous matrix of the copolymer containing one or more monovinylidene aromatic compounds and one or more cyclic (meth)acrylate esters and a dispersed phase comprising an impact modifier.

7. The composition according to claim 6 wherein the dispersed phase comprises particles of about 0.05 to about 6.0 microns.

8. The composition according to claim 6 wherein the dispersed phase comprises one or more diene rubbers, ethylene propylene rubbers, ethylene propylene diene (EPDM) rubbers, ethylene copolymer rubbers, acrylate rubbers, polyisoprene rubbers, silicon rubbers, silicon-acrylate rubbers, polyurethanes, thermoplastic elastomers, halogen containing rubbers, or mixtures thereof.

9. The composition according to claim 6 wherein the dispersed phase comprises one or more diene rubbers.

10. The composition according to claim 6 wherein the dispersed phase comprises polybutadiene, polyisoprene, polypiperylene, polychloroprene, or mixtures thereof.

11. The composition according to claim 6 wherein the dispersed phase comprises polybutadiene.

12. The composition according to claim 11 in the form of pellets.

13. The composition according to claim 1 wherein the ratio of the one or more vinylidene substituted aromatic compounds to the one or more cyclic (meth)acrylate esters is about 4:1 to about 1:4 and the composition exhibits a transparency of about 85 percent by weight or greater.

14. A method for preparing a composition according to claim 1 comprising:
    a) contacting one or more monovinylidene aromatic compounds, one or more cyclic (meth)acrylate esters, optionally one or more unsaturated nitriles, and optionally one or more alkyl (meth)acrylates; optionally in the presence of a radical polymerization initiator under conditions such that a copolymer of the one or more monovinylidene aromatic compounds, the one or more cyclic (meth)acrylate esters, optionally one or more unsaturated nitriles, and optionally one or more alkyl (meth)acrylates is formed and optionally in an inert solvent or diluent;
    b) removing unreacted starting materials and solvent or diluent; and
    c) removing the formed copolymer,
    wherein one or more impact modifiers are dispersed or dissolved into a mixture of the one or more vinylidene substituted aromatic compounds, one or more cyclic (meth)acrylate esters, optionally one or more unsaturated nitriles and optionally one or more alkyl (meth)acrylates before introduction of the mixture into a reactor; introducing the formed mixture into a reactor to produce a continuous matrix of the copolymer of one or more vinylidene substituted aromatic compounds, one or more cyclic (meth)acrylate esters, optionally one or more unsaturated nitriles, and optionally one or more alkyl (meth)acrylates and the dispersed phase comprising the impact modifier.

15. A method for preparing a composition according to claim 1 comprising:

a) contacting one or more monovinylidene aromatic compounds, one or more cyclic (meth)acrylate esters, optionally one or more unsaturated nitriles, and optionally one or more alkyl (meth)acrylates; optionally in the presence of a radical polymerization initiator under conditions such that a copolymer of the one or more monovinylidene aromatic compounds, the one or more cyclic (meth)acrylate esters, optionally one or more unsaturated nitriles, and optionally one or more alkyl (meth)acrylates is formed and optionally in an inert solvent or diluent;

b) removing unreacted starting materials and solvent or diluent; and c) removing the formed copolymer, wherein the recovered copolymer is are blended with one or more impact modifiers.

16. The method of claim 15 wherein the one or more vinylidene substituted aromatic compounds, the one or more cyclic (meth)acrylate esters, optionally one or more unsaturated nitriles and optionally one or more alkyl (meth) acrylates are contacted at a temperature of about 80° C. to about 200° C. for about 2 to about 10 hours using a mass polymerization process.

17. An article comprising the composition of claim 1 in the form of a molded or extruded object having a glass transition temperature of about 100° C. or greater and a transparency of 85 percent or greater.

18. A composition, comprising at least one copolymer comprising:

a) from about 20 to about 90 percent by weight of one or more vinylidene substituted aromatic compounds;

b) from about 10 to about 80 percent by weight of one or more polycyclic (meth)acrylate esters;

c) from about 5 percent to about 30 percent by weight of one or more unsaturated nitriles; and d) from about 0 to 60 percent by weight of one or more alkyl (meth)acrylates;

wherein the weight percentage is based on the weight of the copolymer and the copolymer has a weight average molecular weight of about 120,000 g/mole or greater and a glass transition temperature of about 100° C. or greater wherein the molecular weight is determined by gel permeation chromatography using polystyrene standards and the glass transition temperature is determined using differential scanning calorimetry.

19. A method for preparing a composition according to claim 18 comprising:

a) contacting one or more monovinylidene aromatic compounds, one or more cyclic (meth)acrylate esters, optionally one or more unsaturated nitriles, and optionally one or more alkyl (meth)acrylates; optionally in the presence of a radical polymerization initiator under conditions such that a copolymer of the one or more monovinylidene aromatic compounds, the one or more cyclic (meth)acrylate esters, optionally one or more unsaturated nitriles, and optionally one or more alkyl (meth)acrylates is formed and optionally in an inert solvent or diluent;

b) removing unreacted starting materials and solvent or diluent; and c) removing the formed copolymer.

20. The method of claim 19 wherein the one or more vinylidene substituted aromatic compounds, the one or more cyclic (meth)acrylate esters, optionally one or more unsaturated nitriles and optionally one or more alkyl (meth) acrylates are contacted at a temperature of about 80° C. to about 200° C. for about 2 to about 10 hours using a mass polymerization process.

* * * * *

UNITED STATES PATENT AND TRADEMARK OFFICE
CERTIFICATE OF CORRECTION

| | |
|---|---|
| PATENT NO. | : 11,319,389 B2 |
| APPLICATION NO. | : 17/282392 |
| DATED | : May 3, 2022 |
| INVENTOR(S) | : Abidin Balan, Gilbert Bouquet and Pascal E. R. E. J. Lakeman |

It is certified that error appears in the above-identified patent and that said Letters Patent is hereby corrected as shown below:

In the Claims

Claim 8 -Column 24 Line 19- Insert --ethylene propylene rubbers, ethylene propylene diene (EPDM) rubbers, ethylene copolymer rubbers, acrylate rubbers, polyisoprene rubbers, silicon rubbers, silicon-acrylate-- before "rubbers,"

Claim 15 -Column 25 Line 15- Delete "are"

Signed and Sealed this
Third Day of January, 2023

Katherine Kelly Vidal
*Director of the United States Patent and Trademark Office*